US011671894B2

(12) United States Patent
Zhang et al.

(10) Patent No.: US 11,671,894 B2
(45) Date of Patent: Jun. 6, 2023

(54) ROUTING PRIORITY OF NON-CELLULAR OVER CELLULAR

(71) Applicant: QUALCOMM Incorporated, San Diego, CA (US)

(72) Inventors: Juan Zhang, San Diego, CA (US); Ajith Tom Payyappilly, San Diego, CA (US); Tom Chin, San Diego, CA (US); Lenaig Genevieve Chaponniere, La Jolla, CA (US); Amer Catovic, Carlsbad, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/175,584

(22) Filed: Feb. 12, 2021

(65) Prior Publication Data
US 2022/0264421 A1 Aug. 18, 2022

(51) Int. Cl.
*H04W 40/12* (2009.01)
*H04W 76/12* (2018.01)
*H04W 12/72* (2021.01)
*H04W 12/088* (2021.01)
*H04L 9/40* (2022.01)
*H04L 67/141* (2022.01)

(52) U.S. Cl.
CPC ........... *H04W 40/12* (2013.01); *H04L 63/029* (2013.01); *H04L 67/141* (2013.01); *H04W 12/088* (2021.01); *H04W 12/72* (2021.01); *H04W 76/12* (2018.02)

(58) Field of Classification Search
CPC ... H04W 40/12; H04W 12/088; H04W 12/72; H04W 76/12; H04W 84/06; H04L 63/029; H04L 67/141; H04B 7/18528; H04B 7/18571; H04B 7/18576
See application file for complete search history.

(56) References Cited

U.S. PATENT DOCUMENTS

| 9,560,585 | B2 * | 1/2017 | Forssell | H04W 48/18 |
| 2014/0341109 | A1 | 11/2014 | Cartmell et al. | |
| 2015/0334724 | A1 * | 11/2015 | Faccin | H04W 72/56 370/235 |

(Continued)

FOREIGN PATENT DOCUMENTS

WO    WO-2014130091 A1    8/2014

OTHER PUBLICATIONS

Cao, Jin, et al. "A survey on security aspects for 3GPP 5G networks." IEEE communications surveys & tutorials 22.1 (2019): 170-195. (Year: 2019).*

(Continued)

*Primary Examiner* — Sharad Rampuria
(74) *Attorney, Agent, or Firm* — Harrity & Harrity, LLP; Dang M. Vo

(57) ABSTRACT

Various aspects of the present disclosure generally relate to wireless communication. In some aspects, a user equipment (UE) may receive policy information that specifies radio access technology (RAT) priorities for route selection, including a RAT priority of non-cellular over cellular. The UE may establish access for an application over a route that is selected based at least in part on the RAT priority. Numerous other aspects are described.

28 Claims, 10 Drawing Sheets

(56) References Cited

U.S. PATENT DOCUMENTS

| | | | |
|---|---|---|---|
| 2016/0057724 A1* | 2/2016 | Horn | H04W 60/005 |
| | | | 455/435.1 |
| 2017/0215227 A1 | 7/2017 | Duan et al. | |
| 2018/0227738 A1* | 8/2018 | Gupta | H04W 4/80 |
| 2020/0205044 A1* | 6/2020 | Lin | H04L 65/1016 |
| 2021/0112513 A1* | 4/2021 | Chun | H04W 48/18 |
| 2022/0022029 A1* | 1/2022 | Di Girolamo | H04W 4/50 |
| 2022/0078692 A1* | 3/2022 | Stojanovski | H04W 36/0022 |

OTHER PUBLICATIONS

Kaloxylos, Alexandros. "A survey and an analysis of network slicing in 5G networks." IEEE Communications Standards Magazine 2.1 (2018): 60-65. (Year: 2018).*
International Search Report and Written Opinion—PCT/US2021/072856—ISA/EPO—dated Mar. 23, 2022.
Qualcomm Incorporated: "PLMN Selection for Satellite Networks", 3GPP Draft, C1-204670, 3GPP TSG CT WG1 Meeting #125-e, 3rd Generation Partnership Project (3GPP), Mobile Competence Centre, 650, Route Des Lucioles, F-06921 Sophia-Antipolis Cedex, France, vol. CT WG1, No. Electronic meeting, Aug. 20, 2020-Aug. 28, 2020, Aug. 13, 2020 (Aug. 13, 2020), XP051919250, 3 Pages, Retrieved from the Internet: URL:https://ftp.3gpp.org/tsg_ct/WG1_mm-cc-sm_ex-CN1/TSGC1_125e/Docs/C1-204670.zip C1-204670-DP_PLMN_selection_for_satellite_r2.doc [retrieved on Aug. 13, 2020] 2. Discussion.

* cited by examiner

ROUTING PRIORITY OF NON-CELLULAR OVER CELLULAR

FIELD OF THE DISCLOSURE

Aspects of the present disclosure generally relate to wireless communication and to techniques and apparatuses for using a routing priority of non-cellular over cellular.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving policy information that specifies radio access technology (RAT) priorities for route selection, including a RAT priority of non-cellular over cellular. The method includes establishing access for an application over a route that is selected based at least in part on the RAT priority.

In some aspects, a method of wireless communication performed by a network node includes generating policy information that specifies RAT priorities for UE route selection, including a RAT priority of non-cellular over cellular. The method includes transmitting the policy information to the UE.

In some aspects, a UE for wireless communication includes a memory and one or more processors operatively coupled to the memory, the memory and the one or more processors configured to receive policy information that specifies RAT priorities for route selection, including a RAT priority of non-cellular over cellular, and establish access for an application over a route that is selected based at least in part on the RAT priority.

In some aspects, a network node for wireless communication includes a memory and one or more processors operatively coupled to the memory, the memory and the one or more processors configured to generate policy information that specifies RAT priorities for UE route selection, including a RAT priority of non-cellular over cellular, and transmit the policy information to the UE.

In some aspects, a non-transitory computer-readable medium storing a set of instructions for wireless communication includes one or more instructions that, when executed by one or more processors of a UE, cause the UE to receive policy information that specifies RAT priorities for route selection, including a RAT priority of non-cellular over cellular, and establish access for an application over a route that is selected based at least in part on the RAT priority.

In some aspects, a non-transitory computer-readable medium storing a set of instructions for wireless communication includes one or more instructions that, when executed by one or more processors of a network node, cause the network node to generate policy information that specifies RAT priorities for UE route selection, including a RAT priority of non-cellular over cellular, and transmit the policy information to the UE.

In some aspects, an apparatus for wireless communication includes means for receiving policy information that specifies RAT priorities for route selection, including a RAT priority of non-cellular over cellular, and means for establishing access for an application over a route that is selected based at least in part on the RAT priority.

In some aspects, an apparatus for wireless communication includes means for generating policy information that specifies RAT priorities for UE route selection, including a RAT priority of non-cellular over cellular, and means for transmitting the policy information to the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
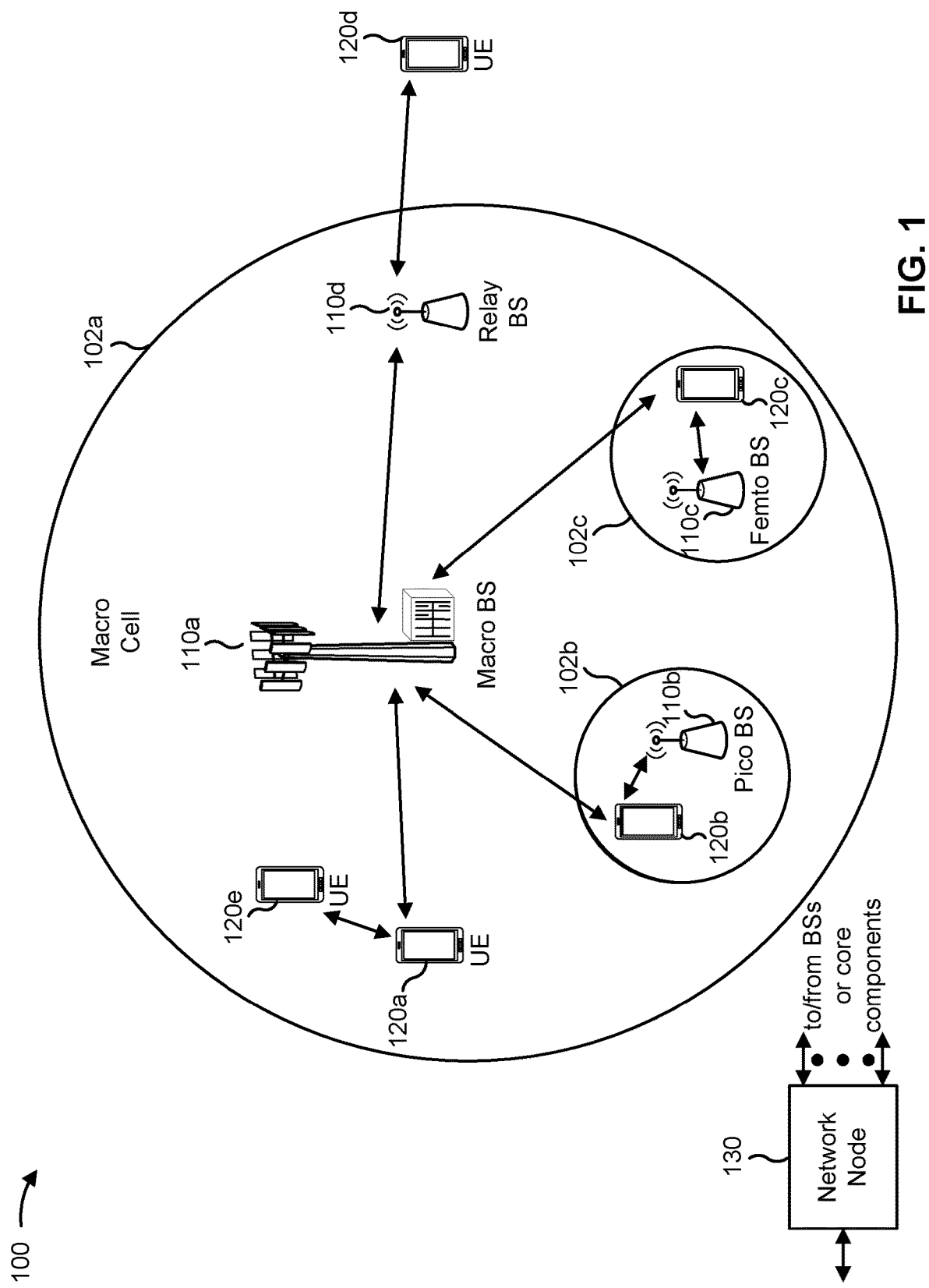
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network node 130 may couple to a set of BSs and may provide coordination and control for these BSs. Network node 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
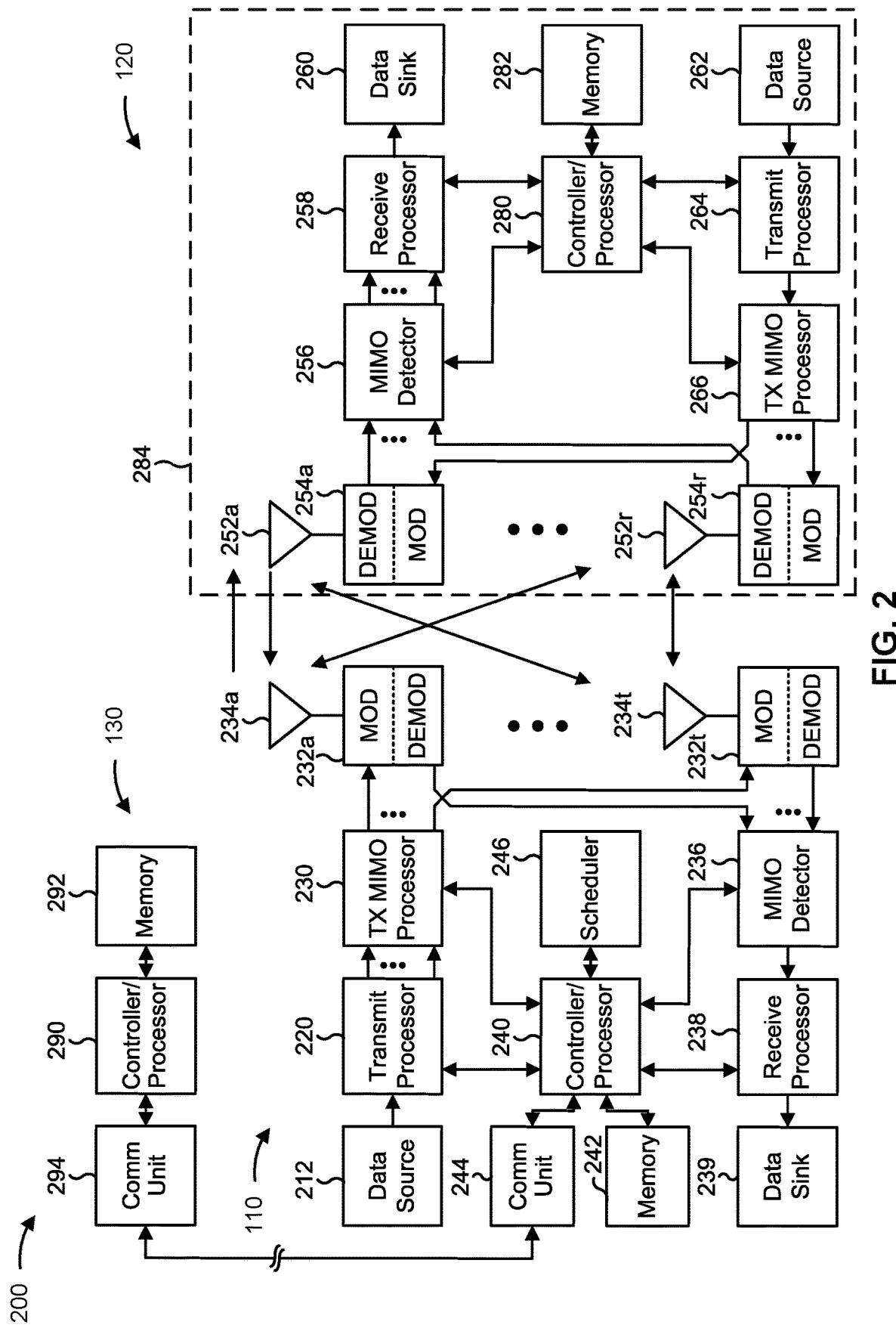
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network node 130 may include communication unit 294, controller/processor 290, and memory 292. Network node 130 may include, for example, one or more devices in a core network, such as a policy server. Network node 130 may communicate with base station 110 via communication unit 294, and base station 110 may communicate with UE 120.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network node 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-10).

Controller/processor 240 of base station 110, controller/processor 280 of UE 120, and/or any other component(s) of FIG. 2 may perform one or more techniques associated with using a routing priority of non-cellular over cellular, as described in more detail elsewhere herein. In some aspects, a network node described herein is a component in a RAN or a core network and may include one or more components described for base station 110 or network node 130 shown in FIG. 2. For example, controller/processor 240 of base station 110, controller/processor 280 of UE 120, controller/processor 290 of network node 130, and/or any other component(s) of FIG. 2 may perform or direct operations of, for example, process 700 of FIG. 7, process 800 of FIG. 8, and/or other processes as described herein. Memories 242, 282, and/or 292 may store data and program codes for base station 110, UE 120, or network node 130, respectively. In some aspects, memory 242, memory 282, and/or memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110, UE 120, and/or network node 130, may cause the one or more processors, UE 120, base station 110, and/or network node 130 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 includes means for receiving policy information that specifies RAT priorities for route selection, including a RAT priority of non-cellular over cellular, and/or means for establishing access for an application over a route that is selected based at least in part on the RAT priority. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for selecting the route according to a RAT priority order of non-cellular, non-cellular over cellular, and cellular.

In some aspects, the network node includes means for generating policy information that specifies RAT priorities for UE route selection, including a RAT priority of non-cellular over cellular, and/or means for transmitting the policy information to the UE. In some aspects, the means for the network node to perform operations described herein may include, for example, one or more of communication unit 294, controller/processor 290, memory 292, transmit processor 220, TX MIMO processor 230, modulator 232, antenna 234, demodulator 232, MIMO detector 236, receive processor 238, controller/processor 240, memory 242, or scheduler 246.

As indicated above, FIG. 2 is provided as an example. Other examples may differ from what is described with regard to FIG. 2.

Figure 3:
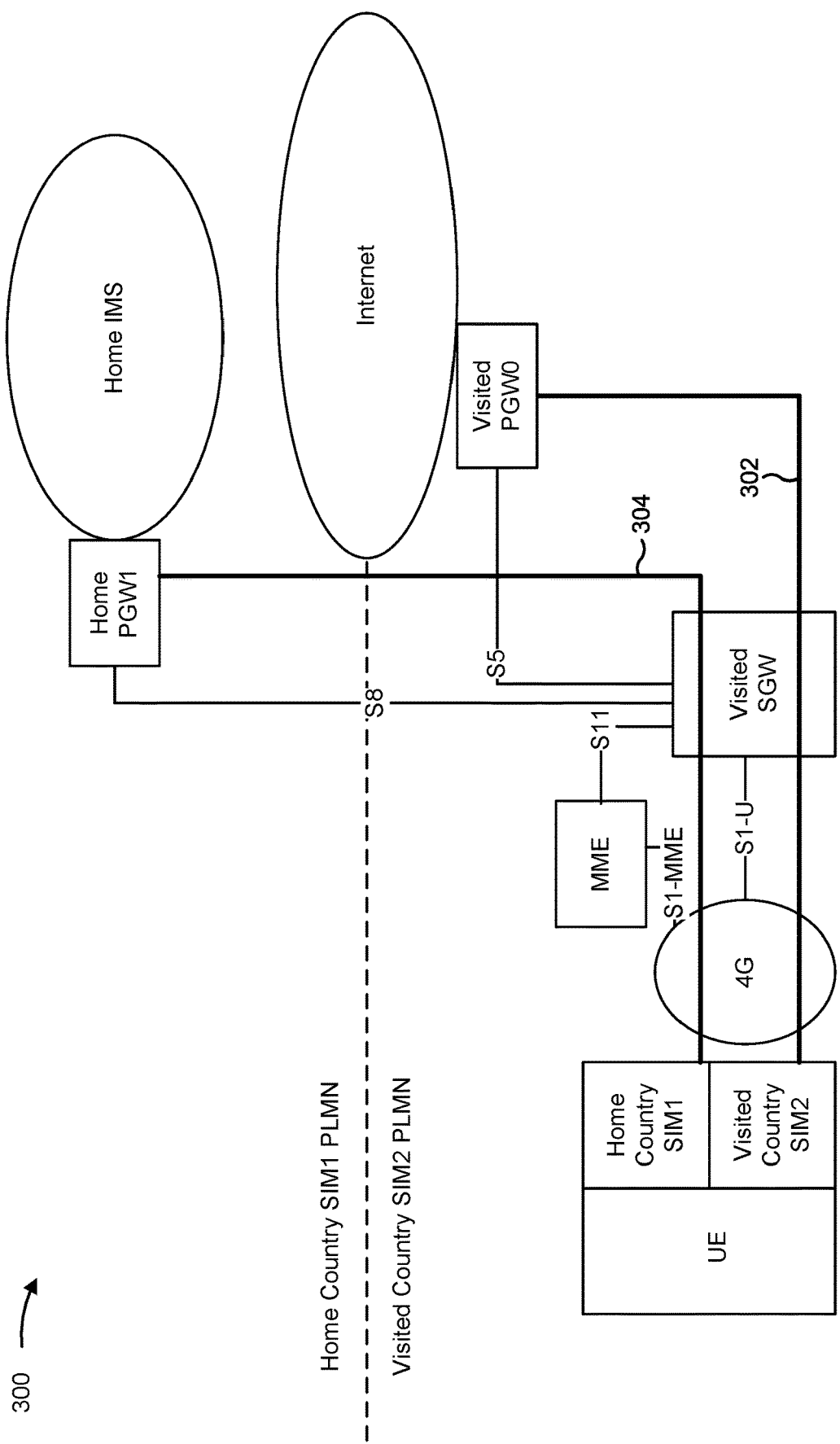
FIG. 3 is a diagram illustrating an example of international roaming, in accordance with the present disclosure.

FIG. 3 is a diagram illustrating an example 300 of international roaming, in accordance with the present disclosure.

A UE may use routing policies for selecting routes for transmitting and/or receiving communications. A routing policy may specify routing hops, which network slice to use, which session and service continuity mode to use, an internet protocol (IP) type, and/or other parameters for a protocol data unit (PDU) session. A routing policy may include a UE route selection policy (URSP) or an access network discovery and selection function (ANDSF) policy that the UE may obtain from a policy server of a network (e.g., 4G, 5G). The routing policies may include traffic descriptors, including route selection descriptors that specify which RAT is to be used, and whether cellular or non-cellular (e.g., WiFi). The route selection descriptors may include RAT priority fields that indicate which RAT has priority over another RAT. In a URSP, there are only two possible values for a RAT priority field: 3GPP (cellular) or non-3GPP (non-cellular). Non-3GPP may include use of a WiFi network or other non-3GPP networks (e.g., CDMA).

Until now, 3GPP and non-3GPP RAT priorities have been sufficient for UE route selection. However, international roaming from a home country public land mobile network (PLMN) to a visited country PLMN has introduced additional issues, and there is no RAT priority for establishing a PDU session on a cellular network of a visited country and establishing, over the PDU session, internet access to an evolved packet data gateway (ePDG) or an interworking function over an N3 interface (N3IWF) of a home country network.

Example 300 shows a UE with a home country subscriber identity module (SIM1) for connecting to a home country network and a visited country SIM2 for connecting to a visited country network. The UE may use the local visited country SIM2 for establishing a connection 302 to access the internet without roaming charges for over-the-top (OTT) applications, but the UE may have to use the home SIM1 to establish a connection 304 for IP multimedia subsystem (IMS) access services, which may incur voice roaming charges. Connection 302 may be set up through a RAN (e.g., 4G) managed by a mobility management entity (MME), through a visited serving gateway (SGW), and to a visited packet data network gateway (PGW0). Connection 304 may be set up to a home PGW (PGW1) for a home IMS.

International roaming costs can be expensive, and eliminating costly roaming charges is an objective of voice and data communications. If a UE is to access an ePDG or an N3IWF over cellular access, neither the 3GPP RAT priority nor the non-3GPP RAT priority applies. As a result, the UE may not prioritize an appropriate route for communications while roaming into a visited country, and this may cause the UE to use a route that is more costly or that consumes power, processing resources, and signaling resources due to inefficiencies.

As indicated above, FIG. 3 is provided as an example. Other examples may differ from what is described with regard to FIG. 3.

Figure 4:
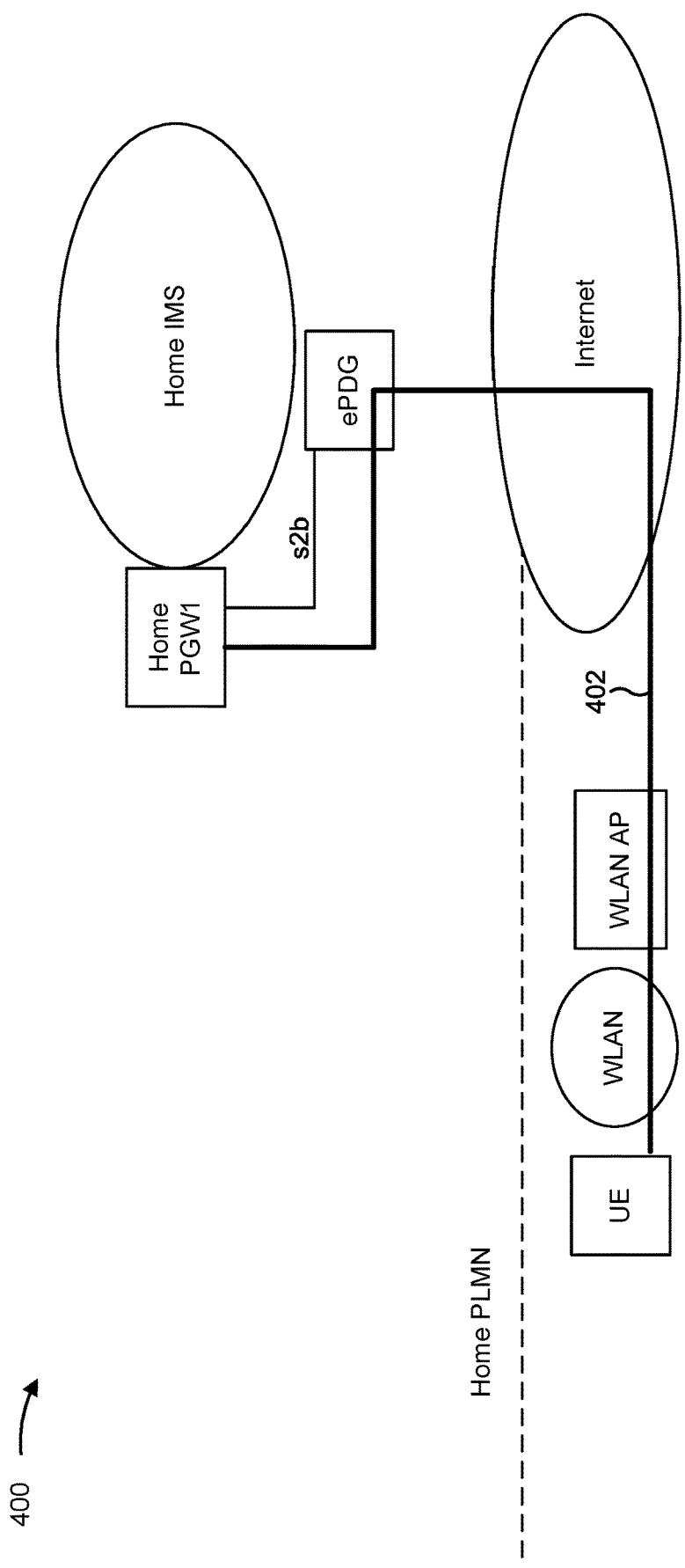
FIG. 4 is a diagram illustrating an example of using WiFi for a voice call, in accordance with the present disclosure.

FIG. 4 is a diagram illustrating an example 400 of using WiFi for a voice call, in accordance with the present disclosure.

Example 400 is provided as an example of a non-3GPP route, which may be over WiFi. Example 400 shows a UE that is using a non-3GPP route, such as WiFi for a voice call, or voice over WiFi (VoWiFi). The UE may set up connection 402 through a wireless local area network (WLAN) via a WLAN access point (AP). Connection 402 may be set up to a home PGW through an ePDG, via an s2b interface. Connection 402 may use the internet rather than cellular access.

As indicated above, FIG. 4 is provided as an example. Other examples may differ from what is described with regard to FIG. 4.

Figure 5:
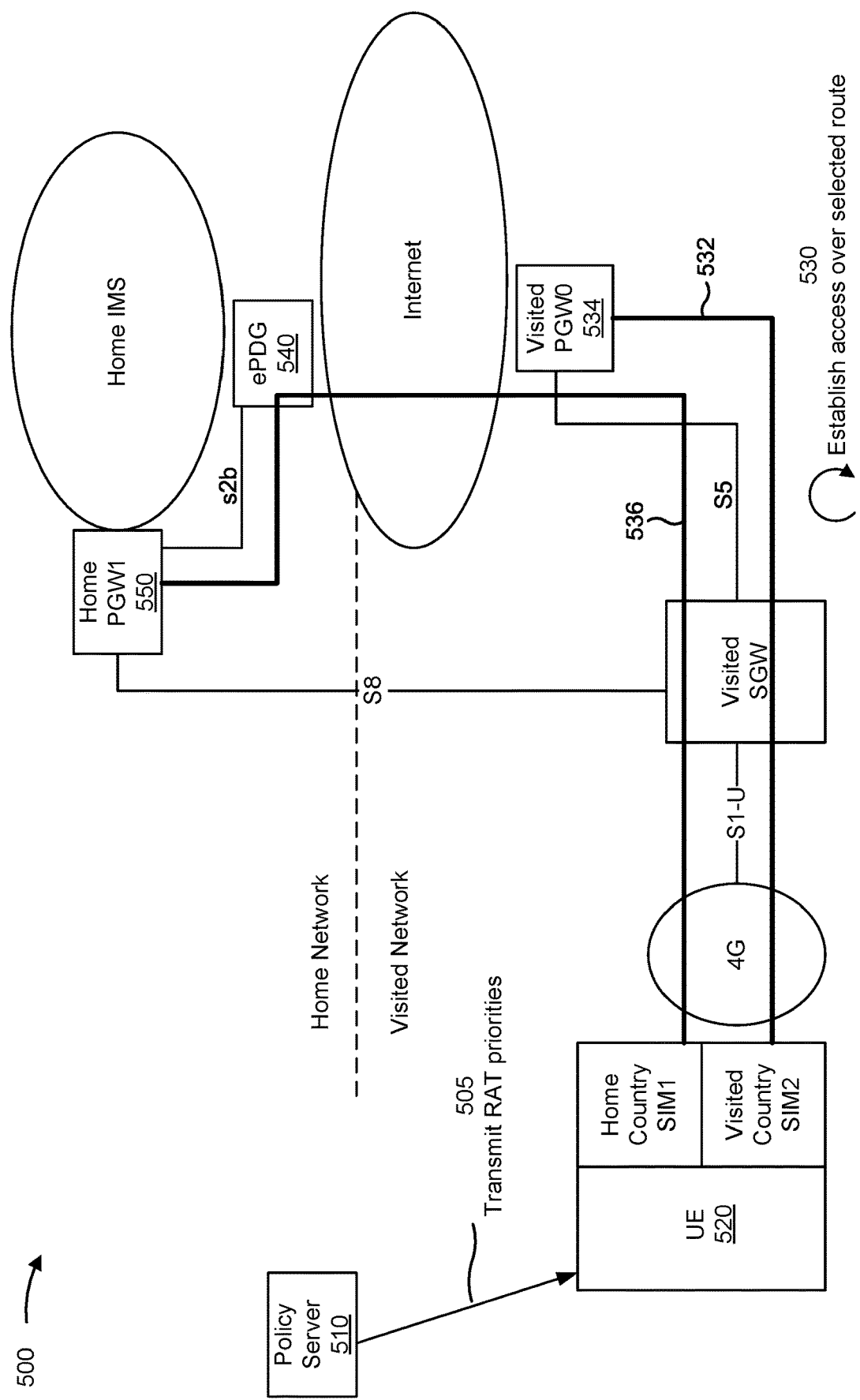
FIG. 5 is a diagram illustrating an example of using a hybrid radio access technology (RAT) priority, in accordance with the present disclosure.

FIG. 5 is a diagram illustrating an example 500 of using a hybrid RAT priority, in accordance with the present disclosure.

According to various aspects described herein, a UE may use a third RAT priority, which may be a hybrid of 3GPP and non-3GPP. The third RAT priority may be referred to as "non-3GPP over 3GPP," "tunnel over 3GPP," or "non-cellular over cellular." For example, for a URSP, a traffic descriptor for an IMS of a particular data network name (DNN) may include a route selection descriptor with RAT priority 1 for non-3GPP, RAT priority 2 for non-3GPP over 3GPP, and a RAT priority 3 for 3GPP. That is, the UE may first attempt, for an application such as a voice call, to set up the voice call over WiFi. If that is not possible, the UE may attempt to set up a non-cellular tunnel over a cellular connection. If that is not possible, the UE may set up the voice call over a cellular connection. This may result in a roaming voice over NR (VoNR) call or a roaming voice over LTE (VoLTE) call. For an ANDSF, access technology number 5 may be added to represent non-3GPP over 3GPP. If the UE is not visiting another network (e.g., foreign country), a URSP policy may not contain the non-3GPP over 3GPP RAT priority.

As shown by reference number 505, a policy server 510 (e.g., network node 130 depicted in FIGS. 1-2, a URSP device, an ANDSF device) may transmit policy information that specifies RAT priorities to UE 520 (e.g., UE 120 depicted in FIGS. 1-2), and the RAT priorities may include at least a RAT priority of non-3GPP over 3GPP.

As shown by reference number 530, UE 520 may establish access for an application over a route that is selected based at least in part on the RAT priority of non-3GPP over 3GPP. This may include setting up a PDU session over cellular and setting up a non-cellular IP security protocol (IPsec) tunnel over the PDU session. Example 500 shows UE 520 setting up a connection 532 to a visited PGW (PGW0) 534. Connection 532 may be a PDU session. UE 520 may set up a connection 536 to ePDG 540 over connection 532. Connection 536 may include an s2b interface from ePDG 540 to home PGW (PGW1) 550. Connection 536 may involve accessing a home IMS or any other type of internet access. In this way, UE 520, when in a visited network (e.g., visited country, visited PLMN, visited private network, stand-alone non-public network), may avoid international roaming charges by using internet access, which is made possible by a cellular connection in the visited network. With a third RAT priority option, UE 520 may save costs on roaming charges and conserve power, processing resources, and signaling resources using more appropriate connections. While example 500 shows a solution with a 4G home network and a 4G visited network, the home network and/or the visited network may be a 5G network.

As indicated above, FIG. 5 is provided as an example. Other examples may differ from what is described with regard to FIG. 5.

Figure 6:
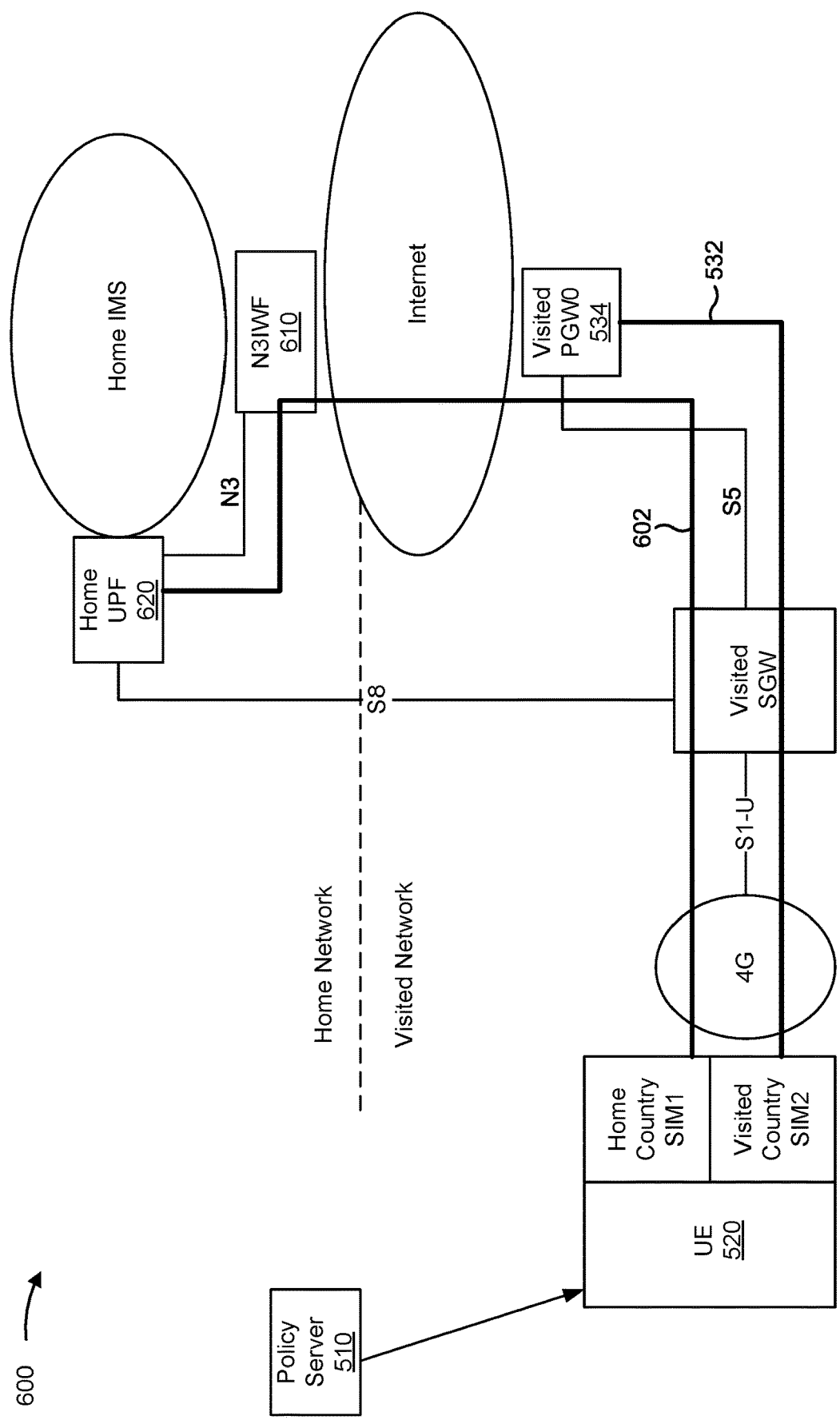
FIG. 6 is a diagram illustrating an example of using a hybrid RAT priority, in accordance with the present disclosure.

FIG. 6 is a diagram illustrating an example 600 of using a hybrid RAT priority, in accordance with the present disclosure. Example 600 shows an example of a visited network that may be a 4G network and a home network that may be a 5G network.

Example 600 shows that UE 520 may set up a connection 602 to an N3IWF 610, where connection 602 continues to a home user plane function (UPF) 620 over an N3 interface.

In some aspects, UE 520 may have multiple subscriber identity modules, such as SIM1 for use in a home network and SIM2 for use in a visited network. Connection 532 may be setup with SIM2 for the local visited network, and connection 536 or connection 602 may be set up with SIM1 for the home network. UE 520 may prefer to use SIM1 for voice calls and/or other applications (e.g., video, instant messaging, virtual private networks). In this way, UE 520 may use a same phone number or other identification information as when in the home network. This is more convenient for a user of UE 520 and may be less costly. While SIMs are described in examples 500 and 600, other credentials (e.g., certificates) may be used for establishing connections.

Alternatively, UE 520 may not be a multi-SIM device or multi-credential device. UE 520 may only have a home SIM or credential but may use other means to access the internet in the visited network. This may include accessing an IMS of a visited network. In either scenario, by using a non-3GPP over 3GPP RAT priority, UE 520 may select a route that uses a tunnel to a home network over a visited network. In this way, UE 520 may save on roaming charges and conserve resources.

As indicated above, FIG. 6 is provided as an example. Other examples may differ from what is described with regard to FIG. 6.

Figure 7:
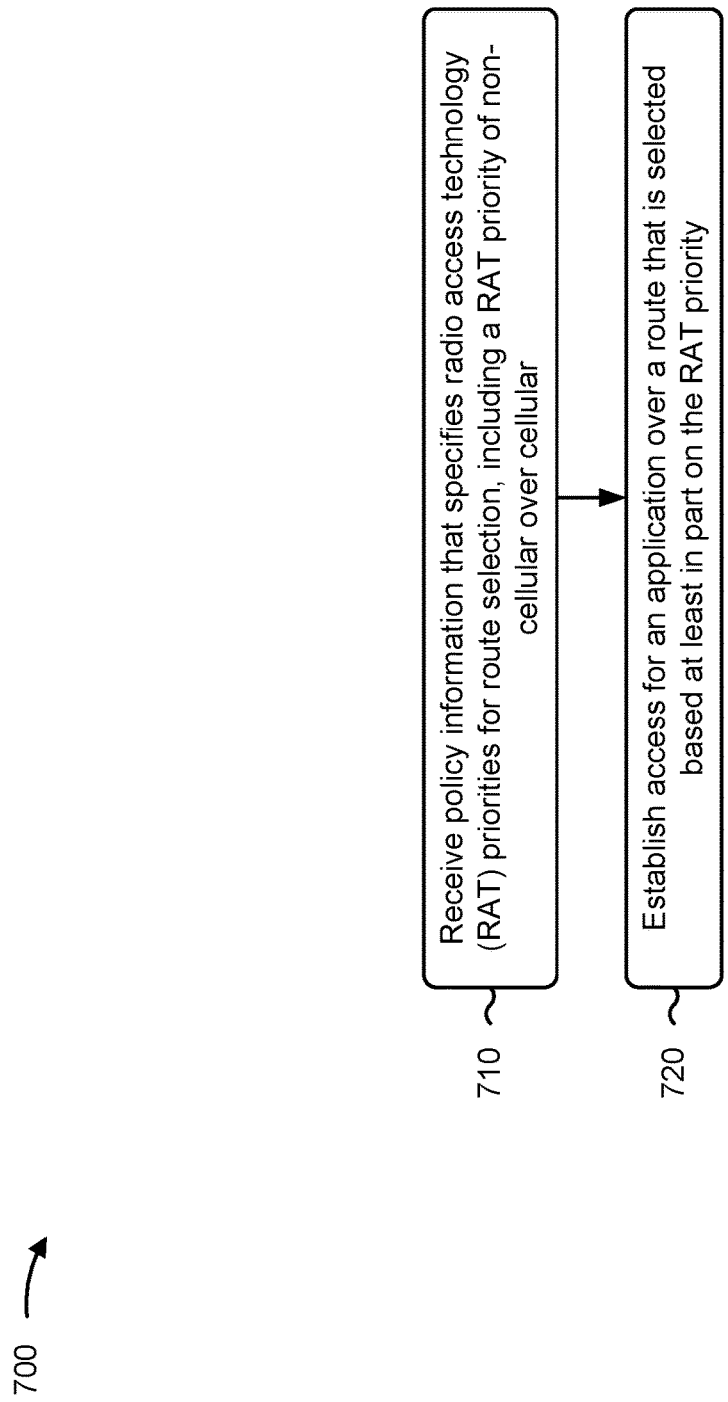
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120 depicted in FIGS. 1-2, UE 520 depicted in FIGS. 5-6) performs operations associated with using a routing priority of non-cellular over cellular.

As shown in FIG. 7, in some aspects, process 700 may include receiving policy information that specifies RAT priorities for route selection, including a RAT priority of non-cellular over cellular (block 710). For example, the UE (e.g., using reception component 902 depicted in FIG. 9) may receive policy information that specifies RAT priorities for route selection, including a RAT priority of non-cellular over cellular, as described above.

As further shown in FIG. 7, in some aspects, process 700 may include establishing access for an application over a route that is selected based at least in part on the RAT priority (block 720). For example, the UE (e.g., using routing component 908 depicted in FIG. 9) may establish access for an application over a route that is selected based at least in part on the RAT priority, as described above.

Process 700 may include additional aspects, such as any single aspect or any combination of aspects described below and/or in connection with one or more other processes described elsewhere herein.

In a first aspect, the RAT priority of non-cellular over cellular is available if the UE is to establish access from a visited network.

In a second aspect, alone or in combination with the first aspect, the selected route is a non-cellular over cellular route, and establishing access includes setting up a PDU session and setting up an IPSec tunnel over the PDU session.

In a third aspect, alone or in combination with one or more of the first and second aspects, the PDU session is set up with a visited network SIM or credential of the UE, and the IPSec tunnel is set up with a home network SIM or credential of the UE.

In a fourth aspect, alone or in combination with one or more of the first through third aspects, the PDU session is set up by accessing IP connectivity of a visited network.

In a fifth aspect, alone or in combination with one or more of the first through fourth aspects, the IPSec tunnel is set up to an ePDG.

In a sixth aspect, alone or in combination with one or more of the first through fifth aspects, the IPSec tunnel is setup to an N3IWF.

In a seventh aspect, alone or in combination with one or more of the first through sixth aspects, process 700 includes selecting the route according to a RAT priority order of non-cellular, non-cellular over cellular, and cellular.

In an eighth aspect, alone or in combination with one or more of the first through seventh aspects, the application is one of a voice application, a video application, an instant messaging application, or a virtual private networking application.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
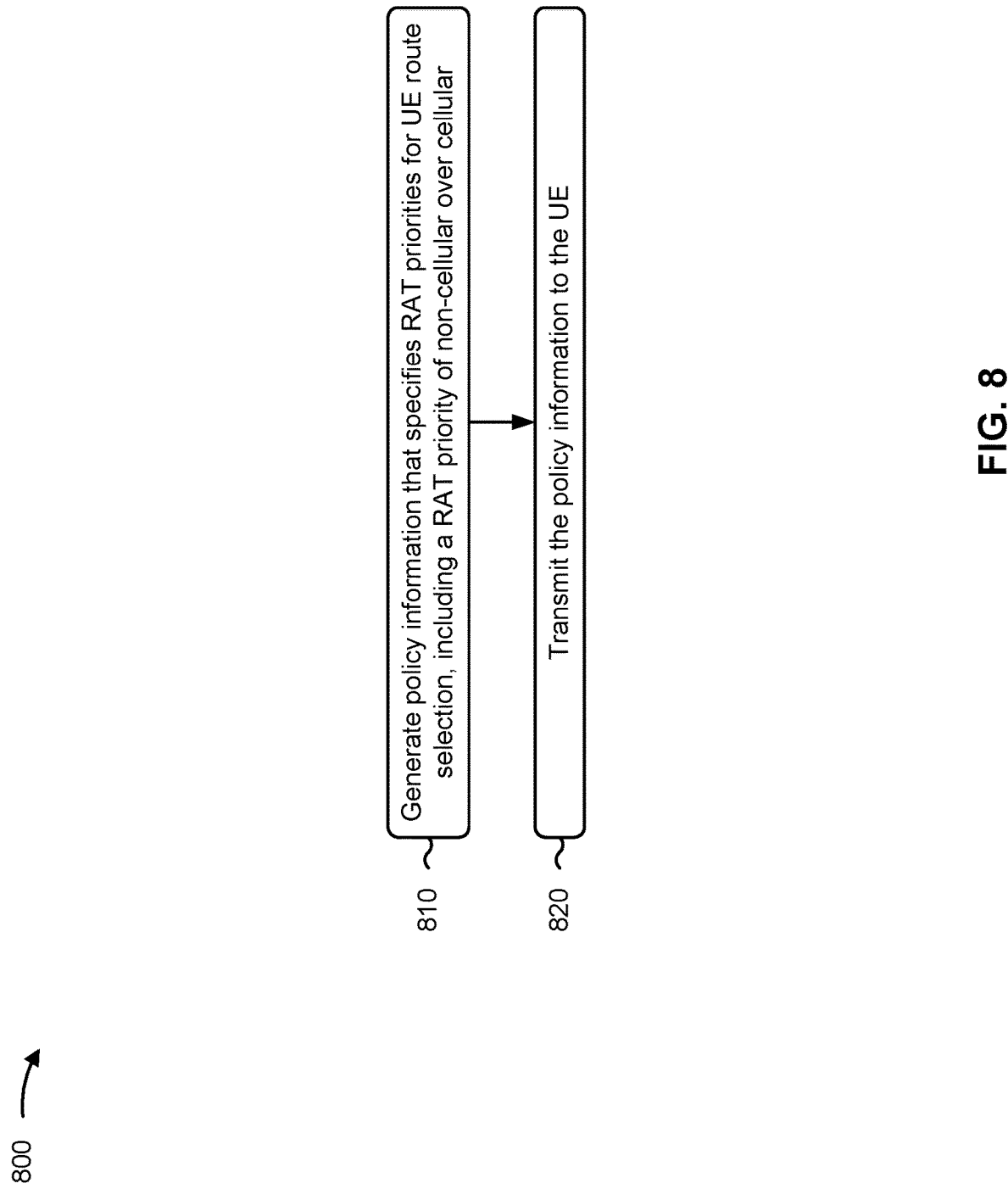
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 130 depicted in FIGS. 1-2, policy server 510 depicted in FIGS. 5-6) performs operations associated with providing a routing priority of non-cellular over cellular.

As shown in FIG. 8, in some aspects, process 800 may include generating policy information that specifies RAT priorities for UE route selection, including a RAT priority of non-cellular over cellular (block 810). For example, the network node (e.g., using generation component 1008 depicted in FIG. 10) may generate policy information that specifies RAT priorities for UE route selection, including a RAT priority of non-cellular over cellular, as described above.

As further shown in FIG. 8, in some aspects, process 800 may include transmitting the policy information to the UE (block 820). For example, the network node (e.g., using transmission component 1004 depicted in FIG. 10) may transmit the policy information to the UE, as described above.

Process 800 may include additional aspects, such as any single aspect or any combination of aspects described below and/or in connection with one or more other processes described elsewhere herein.

In a first aspect, the network node is a policy server or a URSP device.

In a second aspect, alone or in combination with the first aspect, the network node is an ANDSF device.

In a third aspect, alone or in combination with one or more of the first and second aspects, the policy information specifies a RAT priority order of non-cellular, non-cellular over cellular, and cellular.

In a fourth aspect, alone or in combination with one or more of the first through third aspects, the policy information specifies that the RAT priority of non-cellular over cellular is available if the UE is to establish access from a visited network.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
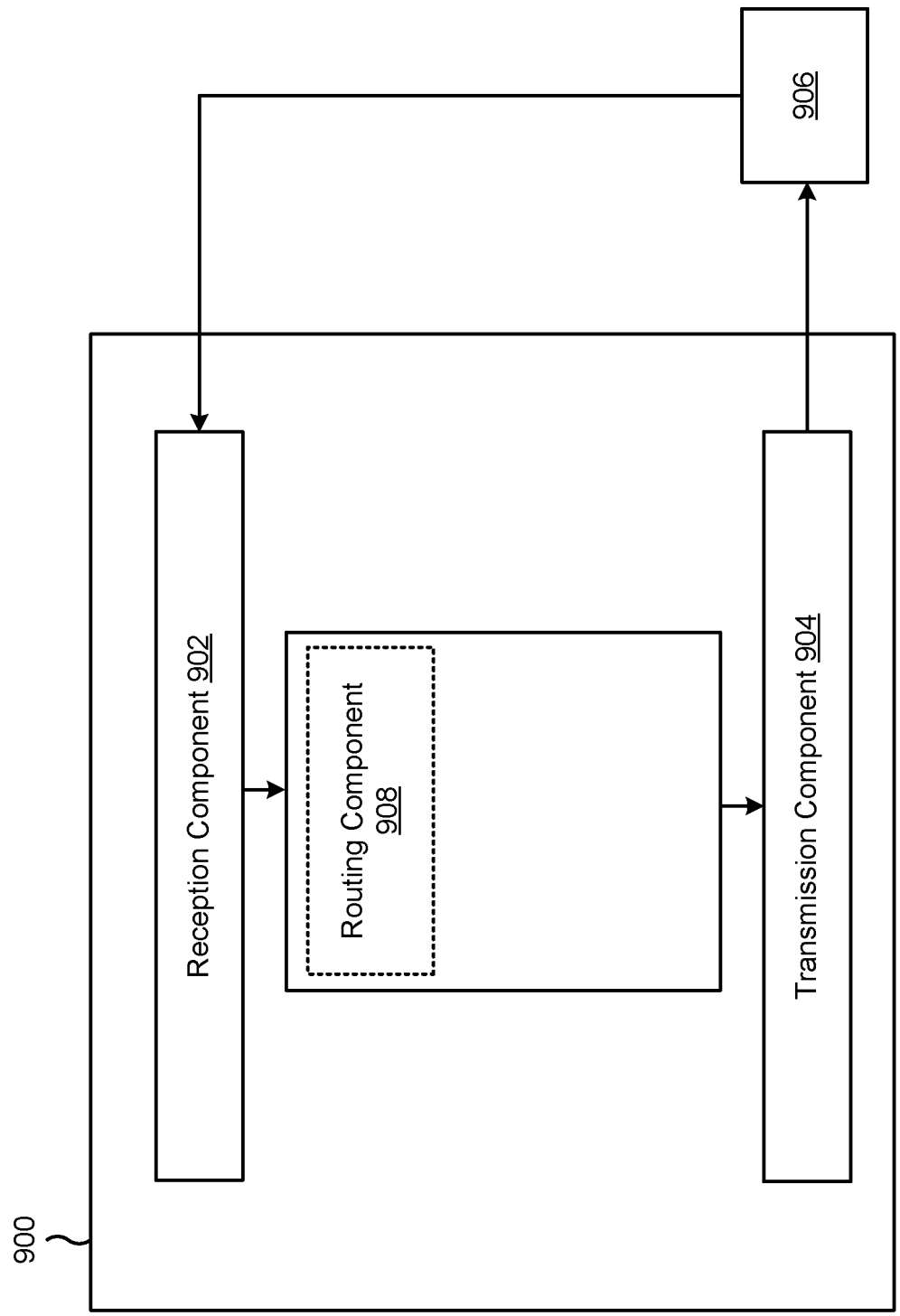
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, a network node, a policy server, or another wireless communication device) using the reception component 902 and the transmission component 904. As further shown, the apparatus 900 may include a routing component 908, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive policy information that specifies RAT priorities for route selection, including a RAT priority of non-cellular over cellular. The routing component 908 may establish access for an application over a route that is selected based at least in part on the RAT priority. The routing component 908 may select the route according to a RAT priority order of non-cellular, non-cellular over cellular, and cellular.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
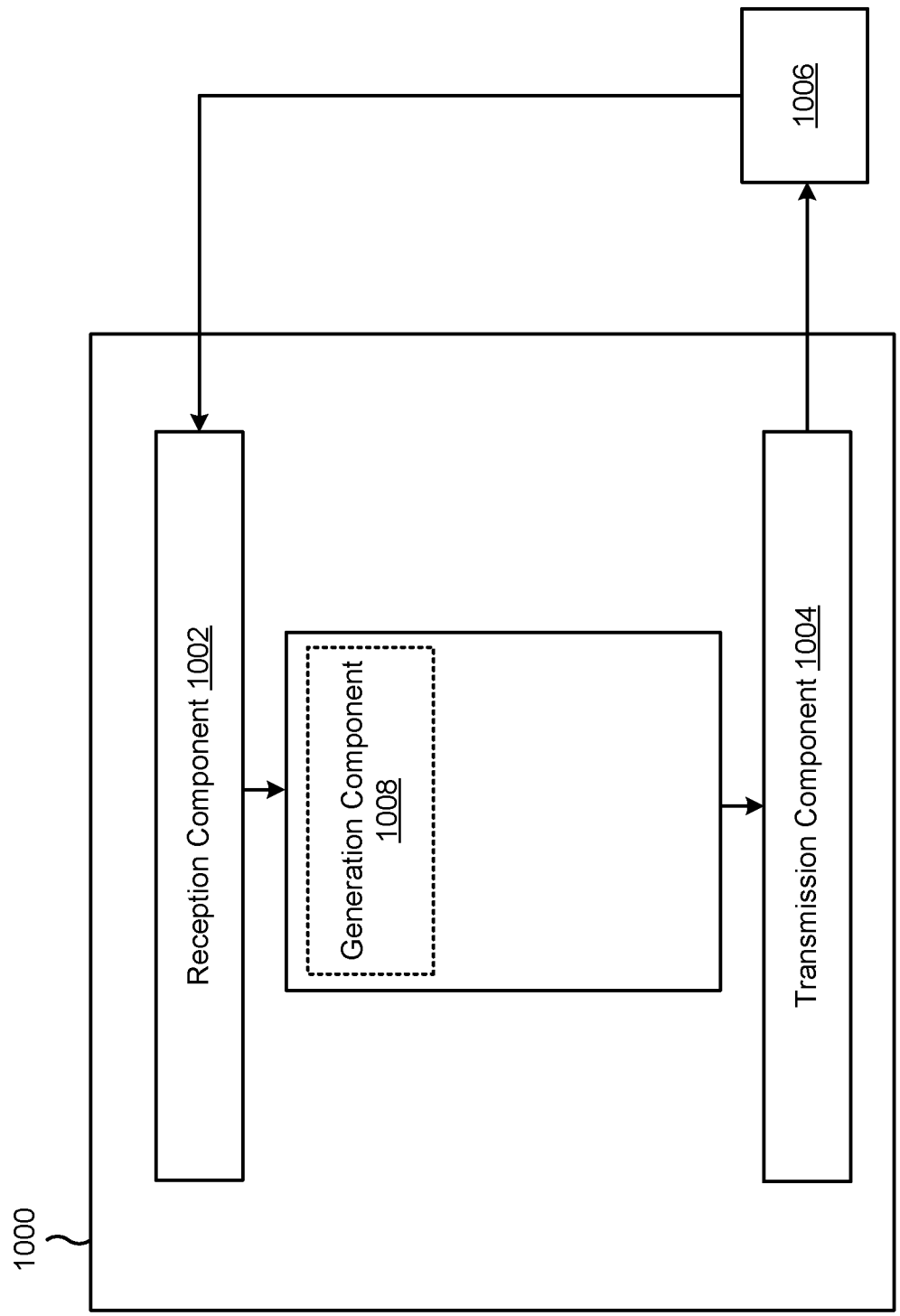

FIG. 10 is a block diagram of an example apparatus 1000 for wireless communication. The apparatus 1000 may be a network node (e.g., policy server, USRP, ANDSF), or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a generation component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the network node described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the network node described above in connection with FIG. 2. In some aspects, the transmission component 1004 may be co-located with the reception component 1002 in a transceiver.

The generation component 1008 may generate policy information that specifies RAT priorities for UE route selection, including a RAT priority of non-cellular over cellular. The transmission component 1004 may transmit the policy information to the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

The following provides an overview of some Aspects of the present disclosure:

Aspect 1: A method of wireless communication performed by a user equipment (UE), comprising: receiving policy information that specifies radio access technology (RAT) priorities for route selection, including a RAT priority of non-cellular over cellular; and establishing access for an application over a route that is selected based at least in part on the RAT priority.

Aspect 2: The method of Aspect 1, wherein the RAT priority of non-cellular over cellular is available if the UE is to establish access from a visited network.

Aspect 3: The method of Aspect 1 or 2, wherein the selected route is a non-cellular over cellular route, and wherein establishing access includes setting up a protocol data unit (PDU) session and setting up an internet protocol security protocol (IPSec) tunnel over the PDU session.

Aspect 4: The method of Aspect 3, wherein the PDU session is set up with a visited network subscriber identity module (SIM) or credential of the UE, and the IPSec tunnel is set up with a home network SIM or credential of the UE.

Aspect 5: The method of Aspect 3, wherein the PDU session is set up by accessing internet protocol connectivity of a visited network.

Aspect 6: The method of Aspect 3, wherein the IPSec tunnel is set up to an evolved packet data gateway (ePDG).

Aspect 7: The method of Aspect 3, wherein the IPSec tunnel is setup to a non-Third Generation Partnership Project (non-3GPP) interworking function (N3IWF)

Aspect 8: The method of any of Aspects 1-7, further comprising selecting the route according to a RAT priority order of non-cellular, non-cellular over cellular, and cellular.

Aspect 9: The method of any of Aspects 1-7, wherein the application is one of a voice application, a video application, an instant messaging application, or a virtual private networking application.

Aspect 10: A method of wireless communication performed by a network node, comprising: generating policy information that specifies radio access technology (RAT) priorities for user equipment (UE) route selection, including a RAT priority of non-cellular over cellular; and transmitting the policy information to the UE.

Aspect 11: The method of Aspect 10, wherein the network node is a policy server or a UE route selection policy device.

Aspect 12: The method of Aspect 10, wherein the network node is an access network discovery and selection function device.

Aspect 13: The method of any of Aspects 10-12, wherein the policy information specifies a RAT priority order of non-cellular, non-cellular over cellular, and cellular.

Aspect 14: The method of any of Aspects 10-13, wherein the policy information specifies that the RAT priority of non-cellular over cellular is available if the UE is to establish access from a visited network.

Aspect 15: An apparatus for wireless communication at a device, comprising a processor; memory coupled with the processor; and instructions stored in the memory and executable by the processor to cause the apparatus to perform the method of one or more Aspects of Aspects 1-14.

Aspect 16: A device for wireless communication, comprising a memory and one or more processors coupled to the memory, the memory and the one or more processors configured to perform the method of one or more Aspects of Aspects 1-14.

Aspect 17: An apparatus for wireless communication, comprising at least one means for performing the method of one or more Aspects of Aspects 1-14.

Aspect 18: A non-transitory computer-readable medium storing code for wireless communication, the code comprising instructions executable by a processor to perform the method of one or more Aspects of Aspects 1-14.

Aspect 19: A non-transitory computer-readable medium storing a set of instructions for wireless communication, the set of instructions comprising one or more instructions that, when executed by one or more processors of a device, cause the device to perform the method of one or more Aspects of Aspects 1-14.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
a memory comprising instructions; and
one or more processors configured to execute the instructions and cause the apparatus to:
set up a protocol data unit (PDU) session on a visited network based at least in part on a radio access technology (RAT) priority of non-cellular over cellular;
set up an internet protocol security protocol (IPSec) tunnel, to an evolved packet data gateway (ePDG) or a non-Third Generation Partnership Project (non-3GPP) interworking function (N3IWF), over the PDU session; and
establish access for an application via a route that is selected based at least in part on the RAT priority of non-cellular over cellular and the set up of the IPSec tunnel.

2. The apparatus of claim 1, wherein the RAT priority of non-cellular over cellular is available if the apparatus is to establish access from the visited network.

3. The apparatus of claim 1, wherein the route is a non-cellular over cellular route.

4. The apparatus of claim 1, wherein the PDU session is set up with a subscriber identity module (SIM) of the visited network or credential of the apparatus, and the IPSec tunnel is set up with a home network SIM or credential of the apparatus.

5. The apparatus of claim 1, wherein the PDU session is set up by accessing internet protocol connectivity of the visited network.

6. The apparatus of claim 1, wherein the IPSec tunnel is set up to the ePDG.

7. The apparatus of claim 1, wherein the IPSec tunnel is setup to the non-3GPP N3IWF.

8. The apparatus of claim 1, wherein the one or more processors are further configured to cause the apparatus to select the route according to a RAT priority order of non-cellular, non-cellular over cellular, and cellular.

9. The apparatus of claim 1, wherein the application is one of a voice application, a video application, an instant messaging application, and a virtual private networking application.

10. The apparatus of claim 1, further comprising:
a receiver configured to receive policy information that specifies RAT priorities for route selection, including the RAT priority of non-cellular over cellular, wherein the apparatus is configured as a user equipment.

11. A network node, comprising:
a memory comprising instructions;
one or more processors configured to execute the instructions and cause the network node to:
generate policy information that specifies radio access technology (RAT) priorities, for user equipment (UE) route selection, including:
a first RAT priority of non-cellular over cellular, and
at least one of a second RAT priority of non-cellular or a third RAT priority of cellular,
wherein the policy information specifies that the first RAT priority of non-cellular over cellular is available when the UE is to establish access from a visited network; and
at least one transmitter configured to execute the instructions and cause the network node to:
transmit the policy information to the UE.

12. The network node of claim 11, wherein the network node comprises at least one of a policy server, a UE route selection policy device, an access network discovery, or a selection function device.

13. The network node of claim 11, wherein the policy information specifies a RAT priority order comprising the first RAT priority of non-cellular over cellular, the second RAT priority of non-cellular, and the third RAT priority of cellular.

14. The network node of claim 11, wherein the policy information prioritizes the first RAT priority over the at least one of the second RAT priority or the third RAT priority.

15. The network node of claim 14, wherein the policy information prioritizes the second RAT priority over the third RAT priority.

16. A method of wireless communication performed at a user equipment (UE), comprising:
setting up a protocol data unit (PDU) session on a visited network based at least in part on a RAT priority of non-cellular over cellular;
setting up an internet protocol security protocol (IPSec) tunnel, to an evolved packet data gateway (ePDG) or a non-Third Generation Partnership Project (non-3GPP) interworking function (N3IWF), over the PDU session; and
establishing access for an application over a route that is selected based at least in part on the RAT priority of non-cellular over cellular and setting up the IPSec tunnel.

17. The method of claim 16, wherein the RAT priority of non-cellular over cellular is available if the UE is to establish access from the visited network.

18. The method of claim 16, wherein the route is a non-cellular over cellular route.

19. The method of claim 16, wherein the PDU session is set up with a subscriber identity module (SIM) of the visited network or credential of the UE, and the IPSec tunnel is set up with a home network SIM or credential of the UE.

20. The method of claim 16, wherein the PDU session is set up by accessing internet protocol connectivity of the visited network.

21. The method of claim 16, wherein the IPSec tunnel is set up to the ePDG.

22. The method of claim 16, wherein the IPSec tunnel is setup to the non-3GPP N3IWF.

23. The method of claim 16, further comprising selecting the route according to a RAT priority order of non-cellular, non-cellular over cellular, and cellular.

24. The method of claim 16, wherein the application is one of a voice application, a video application, an instant messaging application, and a virtual private networking application.

25. A method of wireless communication performed at a network node, comprising:
generating policy information that specifies radio access technology (RAT) priorities, for a user equipment (UE) route selection, including:
a first RAT priority of non-cellular over cellular, and
at least one of a second RAT priority of non-cellular, or a third RAT priority of cellular,
wherein the policy information specifies that the first RAT priority of non-cellular over cellular is available when the UE is to establish access from a visited network; and
transmitting the policy information to the UE.

26. The method of claim 25, wherein the network node comprises at least one of a policy server, a UE route selection policy device, an access network discovery, or a selection function device.

27. The method of claim 25, wherein the policy information specifies a RAT priority order comprising the first RAT priority of non-cellular over cellular, the second RAT priority of non-cellular, and the third RAT priority of cellular.

28. The method of claim 25, wherein the policy information prioritizes the first RAT priority over the at least one of the second RAT priority or the third RAT priority.

* * * * *